(12) United States Patent
Donoghue et al.

(10) Patent No.: US 8,423,907 B1
(45) Date of Patent: Apr. 16, 2013

(54) SYSTEM AND METHOD FOR VERTICAL PATH NAVIGATION

(75) Inventors: Patrick J. Donoghue, Sea Cliff, NY (US); Dale Herigstad, Hollywood, CA (US); Edgar McLaughlin, Lloyd Harbor, NY (US); Brian Sweeney, Oyster Bay, NY (US)

(73) Assignee: CSC Holdings, Inc., Bethpage, NY (US)

( * ) Notice: Subject to any disclaimer, the term of this patent is extended or adjusted under 35 U.S.C. 154(b) by 214 days.

(21) Appl. No.: 13/051,304

(22) Filed: Mar. 18, 2011

Related U.S. Application Data

(63) Continuation of application No. 12/362,144, filed on Jan. 29, 2009, now Pat. No. 8,065,630, which is a continuation of application No. 10/627,682, filed on Jul. 28, 2003, now Pat. No. 7,503,013, said application No. 12/362,160 is a continuation of application No. 10/627,682, filed on Jul. 28, 2003.

(60) Provisional application No. 60/487,620, filed on Jul. 17, 2003.

(51) Int. Cl.
*G06F 3/048* (2006.01)

(52) U.S. Cl.
USPC ........... 715/810; 715/713; 715/818; 715/835; 715/854; 715/855

(58) Field of Classification Search .................. 715/713, 715/719, 803, 810, 818, 819, 820, 828, 829, 715/835, 841, 853, 854, 855
See application file for complete search history.

(56) References Cited

U.S. PATENT DOCUMENTS

| | | | | |
|---|---|---|---|---|
| 6,029,172 | A * | 2/2000 | Jorna et al. ............................ 1/1 |
| 6,445,398 | B1 * | 9/2002 | Gerba et al. .................. 715/721 |
| 6,678,891 | B1 * | 1/2004 | Wilcox et al. .................. 725/42 |
| 6,701,525 | B1 * | 3/2004 | Neervoort et al. .............. 725/38 |
| 6,966,037 | B2 * | 11/2005 | Fredriksson et al. ......... 715/830 |
| 7,293,241 | B1 * | 11/2007 | Tornqvist et al. ............. 715/767 |
| 7,584,427 | B2 * | 9/2009 | Machida et al. .............. 715/713 |
| 7,681,149 | B2 * | 3/2010 | Lahdesmaki ................. 715/841 |
| 2001/0043238 | A1 * | 11/2001 | Guerrero ...................... 345/853 |
| 2002/0024535 | A1 * | 2/2002 | Ueno et al. .................... 345/736 |
| 2003/0001907 | A1 * | 1/2003 | Bergsten et al. .............. 345/853 |
| 2003/0095149 | A1 * | 5/2003 | Fredriksson et al. ......... 345/797 |
| 2003/0169302 | A1 * | 9/2003 | Davidsson et al. ........... 345/810 |
| 2004/0008229 | A1 * | 1/2004 | Hultcrantz .................... 345/810 |
| 2004/0233238 | A1 * | 11/2004 | Lahdesmaki ................. 345/810 |

\* cited by examiner

*Primary Examiner* — Nicholas Augustine
(74) *Attorney, Agent, or Firm* — Goodwin Procter LLP

(57) ABSTRACT

Methods, devices and systems are provided that display images in a manner that provides for effective space management. At least one item is horizontally displayed in a first display area. Upon selection by a user of at least one item from the first display area, an indication of the at least one item is vertically displayed in a second display area.

20 Claims, 13 Drawing Sheets

SYSTEM AND METHOD FOR VERTICAL PATH NAVIGATION

RELATED APPLICATIONS

This application is a continuation application of, and claims priority from, U.S. patent application Ser. No. 12/362,144, filed Jan. 29, 2009, and U.S. patent application Ser. No. 12/362,160, filed Jan. 29, 2009 both of which are continuation applications of, and claim priority from, U.S. patent application Ser. No. 10/627,682, entitled "Systems and Methods for Vertical Path Navigation" filed on Jul. 28, 2003, which claims priority from U.S. provisional patent application 60/487,620, filed Jul. 17, 2003, each of which is are incorporated herein by reference in its entirety.

TECHNICAL FIELD

The present invention relates to display of images. More specifically, the present invention relates to vertical display of one or more selected items within an image.

BACKGROUND INFORMATION

Electronic devices used today often have displays that present users with images which may include menus or lists of items. A user may need to make selections from the presented items. Accordingly, graphical user interfaces have been developed to allow a user to make such selections.

However, some electronic devices may present a user with a whole series of such menus or lists of items, such that the use of such devices may be complicated and difficult for a user, resulting in frustration or even rejection of the device. Many devices use such menus or lists, such as personal data assistants, cameras, VCRs, computers, cable television interfaces, home security systems, etc. Users often become frustrated with such devices because of the complicated menus that lead to more menus, and the difficulty navigating among the different levels that may be presented.

Further, many of these devices have screens or monitors that have limited space. Manufacturers of such devices have found it difficult to present a user with an interface that allows a user to easily navigate among complex levels of menus or lists due to the limited screen size and complicated menus.

Accordingly, what is needed is an interface that enables a user to easily make selections, to easily navigate through different levels, and to provide effective space management of the limited amount of screen space.

SUMMARY OF THE INVENTION

Embodiments of the present invention provide for methods, devices and systems that display images in a manner that provides for effective space management. At least one item is horizontally displayed in a first display area. Upon selection by a user of at least one item from the first display area, an indication of the at least one item is vertically displayed in a second display area.

DETAILED DESCRIPTION

Embodiments of the present invention provide for methods, devices and systems that display images in a manner that provides for effective space management. The present invention is particularly useful as a user interface in electronic devices and systems that utilize menus or lists having at least one item for selection, particularly where the selection generates at least one additional menu or list, as further explained below.

Figure 1:
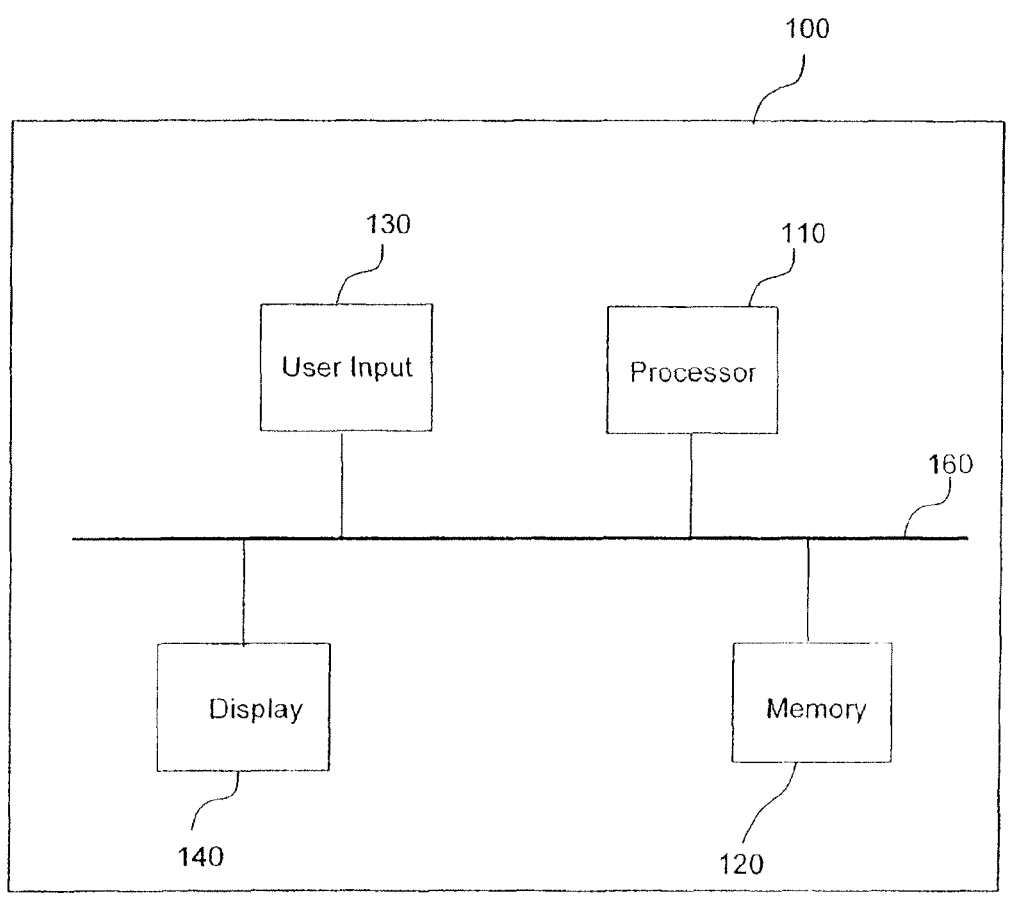
FIG. 1 is a block diagram of an embodiment of the present invention.

FIG. 1 depicts a block diagram of an embodiment of the present invention. Device 100 is an electronic device suitable for use with the present invention. The device 100 includes a processor 110, a memory 120, a user input 130 and a display 140. The memory 120 may contain software to be run in conjunction with processor 110, and may cause images to be displayed on display 140. In conjunction with embodiments of the invention, a user may view images on display 140, and may provide input to device 100 via user input 130.

The processor 110 may be a general-purpose microprocessor, such a Pentium series microprocessor manufactured by the Intel Corporation of Santa Clara, Calif. In another embodiment, the processor 110 can be an Application Specific Integrated Circuit (ASIC), which has been designed to implement in its hardware and/or firmware at least a part of a method in accordance with embodiments of the present invention.

Memory 120 can be any device capable of storing analog or digital information, such as a hard disk, Random Access Memory (RAM), Read Only Memory (ROM), flash memory, a compact disk, a magnetic tape, a floppy disk, and any combination thereof, for example.

User input 130 can be any type of input device, such as a keyboard, keypad, pointing device, microphone, mouse, wired or wireless remote control, touch pad, touch screen, a port(s) to attach other input devices, voice recognition software, etc. Any type of input device will function in accordance with embodiments of the present invention.

The display 140 can be any type of display or screen that is capable of displaying images. For example, the display may be a CRT or LCD monitor, a heads-up display, a television, etc. The display 140 may be structurally included as part of the electronic device, or may be physically separated from but connected with the other components of device 100, such as a monitor in a desktop computer.

The electronic device 100 may be any device capable of displaying images. For example, electronic device 100 may be a computer such as a desktop, handheld or laptop computer, a camera, a watch, a personal data assistant, a security system, a television, a radio, a cable television system, a personal video recorder, a direct broadcast television system, etc.

Embodiments of the present invention will display images on display 150 to allow a user to easily navigate through displayed items. For example, embodiments of the present invention allow a user to easily navigate through lists or menus of displayed items. Where the displayed items have many levels, embodiments of the present invention allow easy navigation to different levels, as further explained below.

Figure 2:
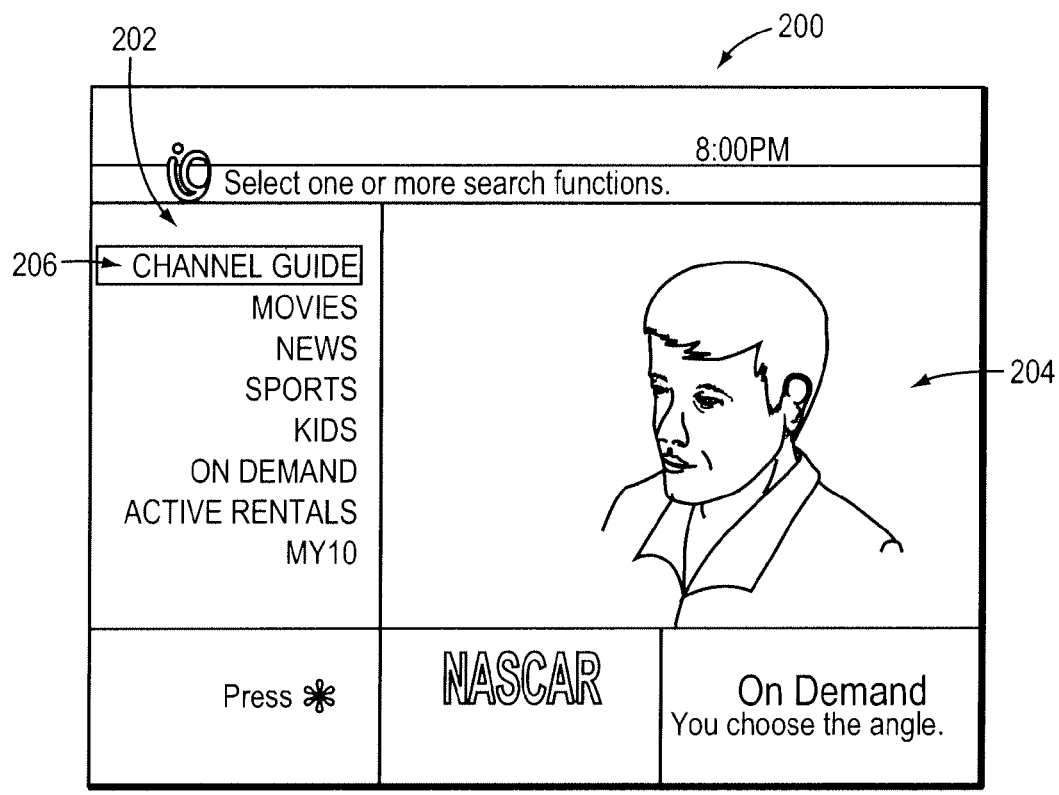
FIG. 2 is a diagram illustrating images in accordance with an embodiment of the present invention.

FIG. 2 illustrates image 200 produced in accordance with an embodiment of the present invention. The images shown in FIG. 2 and subsequent figures are particularly useful in a cable television system, but the vertical display of selected items as discussed herein may be used with any display and still be within the scope of the present invention. Image 200 may include a video image 204, which may be a program currently being viewed by a user, or a preview of an available program, for example.

Image 200 also includes at least one horizontally displayed item 202. The at least one horizontally displayed item 202 may be displayed in the form of a list or menu if more that one item is present. The term "list" as used herein is defined to include one item or a plurality of items. The term "horizontally" as used herein is intended to include display of items from right to left, or from left to right on the display. For example, if words are the displayed items, the letters in the words will generally traverse from left to right across the display.

A user may be able to place a screen indicator 206 on an item from one of the horizontally displayed items. For example, the screen indicator could be a highlighted portion that is controlled by the user with user input 130. For example, the user may be able to control the screen indicator 206 with a remote control or a mouse. The user may also be able to select the indicated item with the user input 130. For example, a user may be able to select an indicated item by clicking on a mouse or pressing an appropriate key on a remote control.

Figure 3:
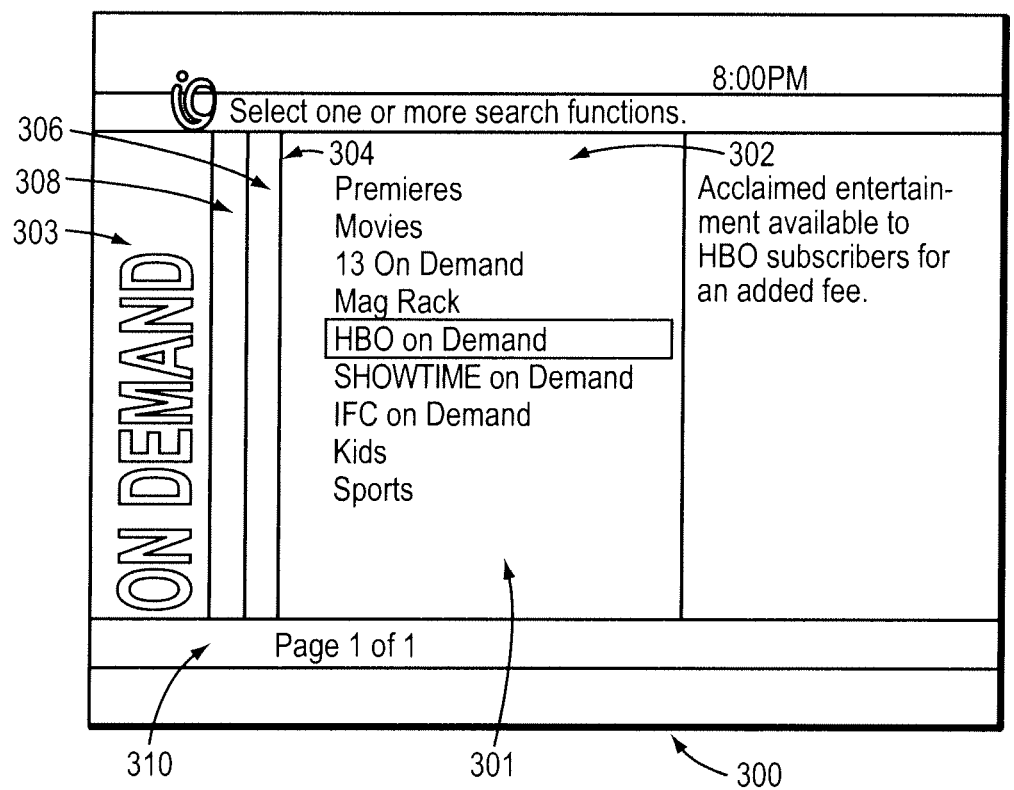
FIG. 3 is a diagram illustrating images accordance with an embodiment of the present invention.

FIG. 3 illustrates a further image that is generated in accordance with the present invention when the user selects an item from the horizontally displayed at least one item or list of items 202. In the case of the images displayed in FIGS. 2 and 3, the image 300 displayed in FIG. 3 is generated in response to the user selecting the "ON DEMAND" item from the list of items 202. In response to the selection of the horizontally displayed "ON DEMAND" item, a second horizontally displayed item or list of items 302 is generated and displayed in a first display area 301. The second horizontally displayed item or list of items 302 corresponds to the selected item from the horizontally displayed at least one item or list of items 202. For example, as shown in FIG. 3, the items displayed in the second horizontally displayed item or list of items 302 are items that are available "ON DEMAND" to a user.

Further, an indication 303 of the selected item from the first horizontally displayed at least one item or list of items 202 is vertically displayed in a first vertical display area 304. The indication 303 may use the same wording as used in the selected item or may use different wording or some other indication. The vertically displayed indication 303 is shown as "ON DEMAND MENU", while the selected item was "ON DEMAND", and thus the term "MENU" was added to the indication, although "ON DEMAND" would work equally as well as the indication.

The first vertical display area 304 may be adjacent the horizontal display area 301 as shown in FIG. 3, or may be separated there from. Second and third vertical display areas 306 and 308 are also present, and will be further explained below. The vertical display areas display items in a vertical fashion, which may be substantially perpendicular to the items displayed horizontally in horizontal display area 301. The term "vertically displayed" as used herein is intended to include items displayed from top to bottom or from bottom to top, on the display. For example, if the displayed items are words, the letters in the words will traverse from top to bottom or from bottom to top, on the screen. The letters may be turned sidewise at a substantially 90 degree angle as shown in the figures, or the letters may be displayed upright, as long as the letters traverse from top to bottom, or bottom to top on the screen.

The image 300 may also include a static primary screen name 310 that is established once a user makes a first selection from the horizontally displayed item or list of items 302. The primary screen name 310 is used to visually indicate a content area.

A user can again place a screen indicator on any item from the horizontally displayed item or list of items 302. For example, "HBO on Demand" is shown highlighted in FIG. 3. The user may also select one of the horizontally displayed item or list of items 302, which will result in a further image being generated, as explained below.

Figure 4:
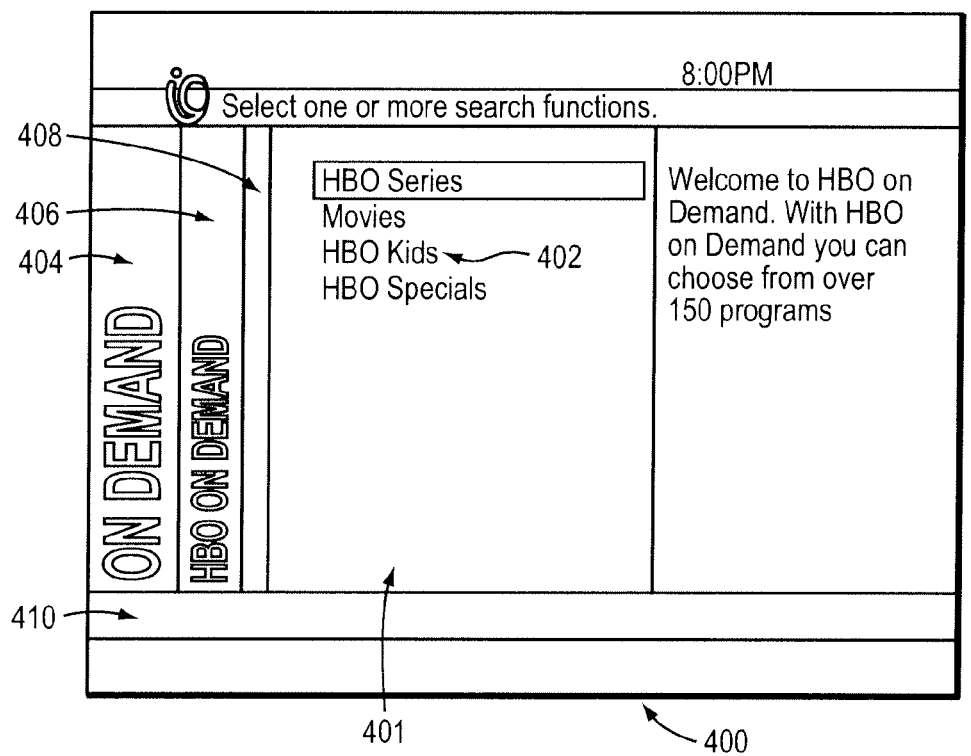
FIG. 4 is a diagram illustrating images in accordance with an embodiment of the present invention.

FIG. 4 illustrates the image 400 that is generated when a user selects the "HBO on Demand" item from image 300. The "ON DEMAND MENU" vertically displayed item is moved to the second vertical display area 406, and the item "HBO ON DEMAND" selected from the horizontally displayed item or list of items 302 is now vertically displayed in first vertical display area 404. The exact wording that in the horizontally displayed item does not have to be displayed vertically, but the vertically displayed item may be a item corresponding to or associated with the horizontally displayed item or and indication as displayed above. In this image 400, vertical display area 408 is empty and the primary screen name 310 "ON DEMAND" is still displayed. Additionally, a third horizontally displayed item or list of items 402 is displayed in horizontal display area. The third horizontally displayed item or list of items 402 corresponds to the selected item, "HBO on Demand", from the horizontally displayed item or list of items 302. In the example illustrated the selected item, "HBO on Demand", results in the subsequent display of HBO items that are available on demand. As shown in FIG. 4, any of the items may have a screen indicator placed on them by user input. FIG. 4 illustrates the example where the screen indicator in placed on the horizontally displayed item "HBO Series", although it can be placed on any of the items. Additionally, the screen indicator may be placed on the vertically displayed items in vertical display areas 404 or 406, and the vertically displayed items may be selected by the user. For example, if the user selects the "ON DEMAND MENU" from FIG. 4, the system will cause the image of FIG. 3 to be generated and displayed. The vertically displayed, static primary screen name 410 continues to be displayed.

Figure 5:
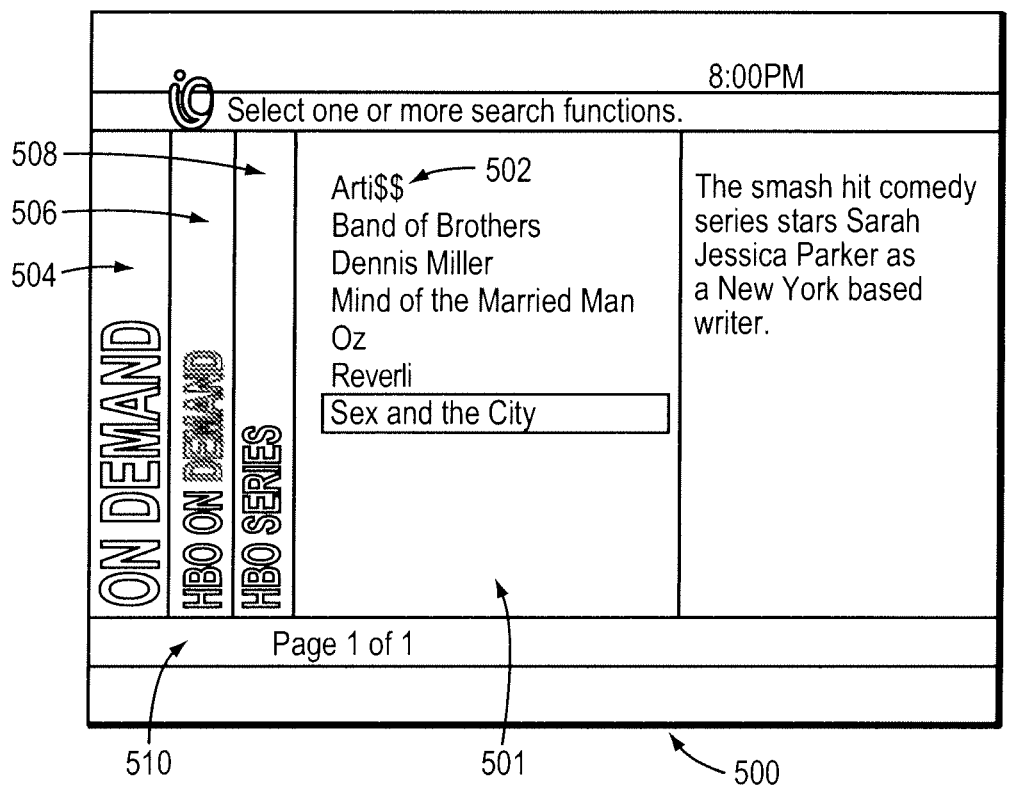
FIG. 5 is a diagram illustrating images in accordance with an embodiment of the present invention.

When the user is viewing the image 400 and selects one of the horizontally displayed item or list of items 402, a new image is generated and displayed. For example, if the user selects "HBO Series" from the image 400, a new image 500 is generated and displayed, as shown in FIG. 5. The new image 500 includes horizontally displayed item or list of items 502 in horizontal display area 501. The vertically displayed item "HBO ON DEMAND" that had been displayed in the first vertical display area 404, is now displayed in the second vertical display area 506, and the vertically displayed item "ON DEMAND MENU" that had been displayed in the second vertical display area, is now displayed in the third vertical display area 508. The user may place the screen indicator on any of the horizontally displayed item or list of items, or on any of the vertically displayed items. Any of these items may be selected. Thus, the present invention provides vertical path navigation to previously displayed items or lists of items, in this case by user selection of either of the vertically displayed items in vertical display areas 506 or 508. The vertically displayed, static primary screen name 510 continues to be displayed.

Figure 6:
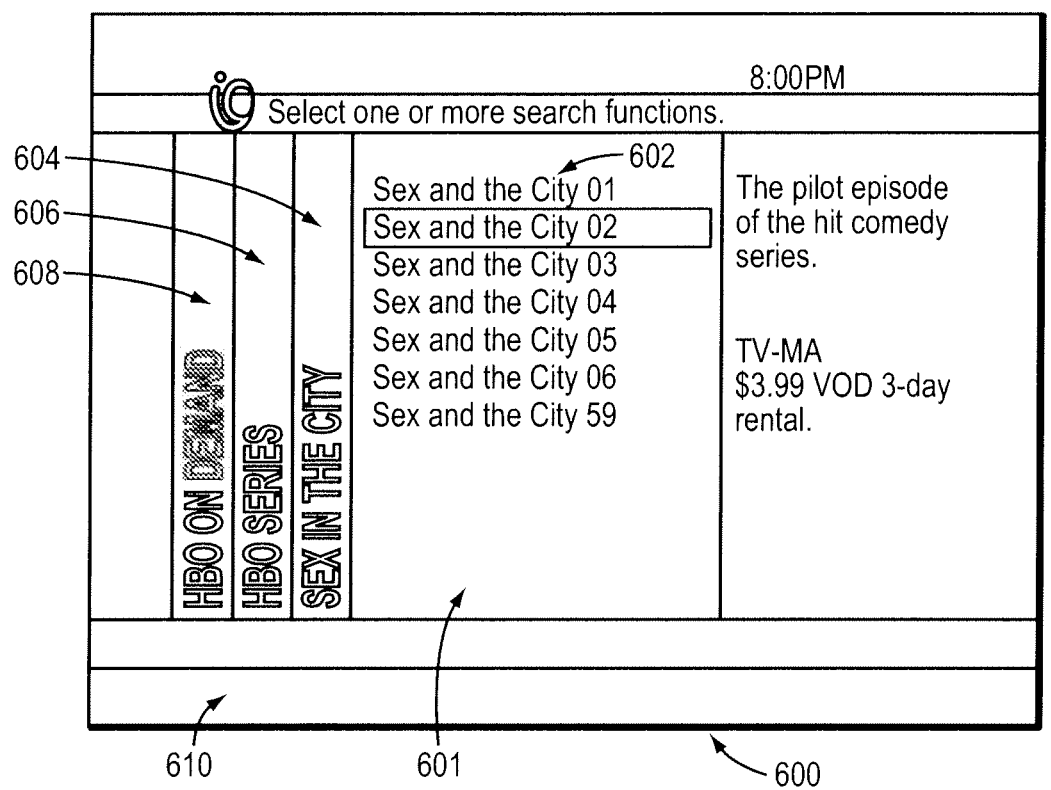
FIG. 6 is a diagram illustrating images in accordance with an embodiment of the present invention.

FIG. 6 illustrates an image 600 that is generated when the user selects the horizontally displayed item "Sex and the City" from the horizontal display area 501. A new item or list of items corresponding to the selected item "Sex and the City" is displayed in horizontal display area 601. The selected item "Sex and the City" that had been horizontally displayed in horizontal display area 501, is now vertically displayed in first vertical display area 604. The "HBO SERIES" item that had been vertically displayed in the first vertical display area 504 is now vertically displayed in the second vertical display area 606. The "HBO ON DEMAND" item that had been vertically displayed in the second vertical display area 506, is now vertically displayed in the third vertical display area 608. The vertically displayed item "ON DEMAND MENU" that had been vertically displayed in the third vertical display area 508, is now moved to a non-visible portion, which will be further explained below in conjunction with FIG. 10. The vertically displayed, static primary screen name 610 continues to be displayed.

The user can again move a screen indicator to any of the horizontally displayed item or list of items 602, or to any of the vertically displayed items in vertical display areas 604, 606 or 608, by using the user input 130. Further, the user may cause the "ON DEMAND MENU" item that had been moved to the non-visible portion to be again displayed in the third vertical display area 608. For example, if user input is a remote control, it may include appropriate buttons for such actions, such as right and left arrow buttons. Also, the "SEX AND THE CITY" item that had been displayed in vertical display area 604 is now moved to another non-visible portion, which may itself be accessed, for example, by use of a right arrow on a remote control.

Figure 7:
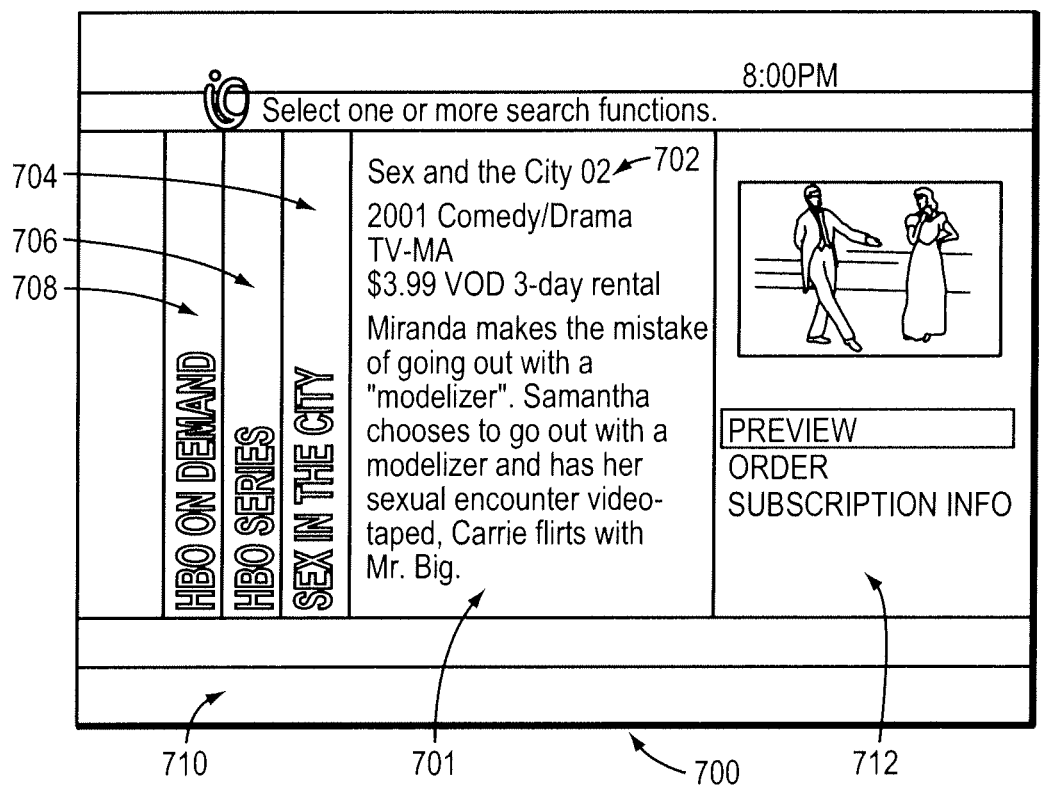
FIG. 7 is a diagram illustrating images in accordance with an embodiment of the present invention.

FIG. 7 illustrates image 700 that is generated when the user selects horizontally displayed item "Sex and the City 02" from image 600. In this case, the horizontal display area 701 has non-selectable items, which may include information about the selected item "Sex and the City 02" such as a price for purchase, a rating, a type of program, a description, etc. In this case, the vertically displayed items in vertical display areas 704, 706 and 708 may remain the same as those displayed in image 600, in particular if the series of vertically displayed item or list of items has reached an end of path. The vertically displayed, static primary screen name 710 continues to be displayed. A vertically displayed item or list of items 712 may be displayed in a second vertical display area 710.

Figure 8:
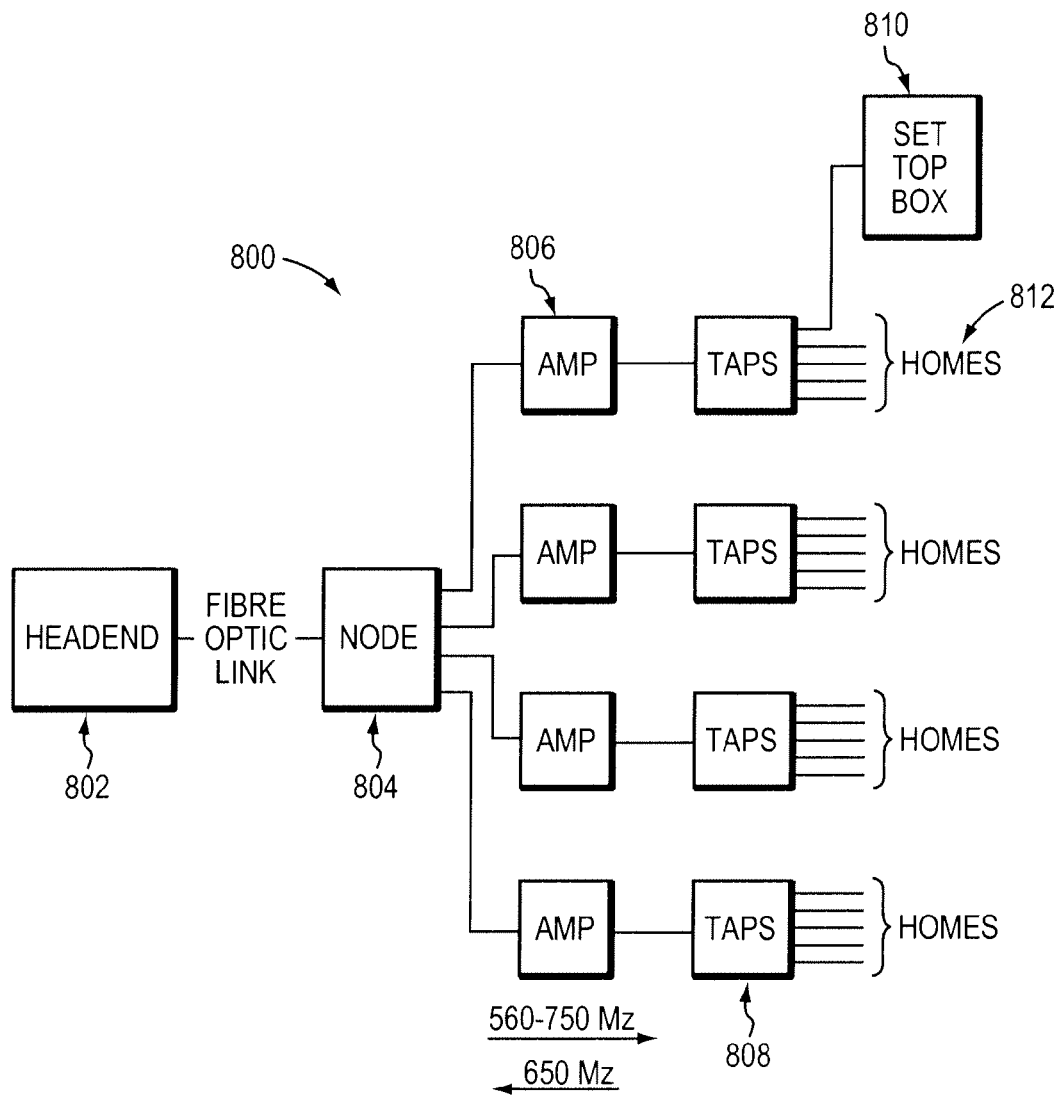
FIG. 8 is a block diagram in accordance with an embodiment of the present invention.

FIG. 8 is a block diagram of a cable television system 800 that may generate images as described above for display on a customer's television. The system 800 includes a head-end 802 from which programming, images and a user interface with vertical navigation originates. Data is transmitted from the head-end 802 to subscriber set top boxes 810 in a subscriber's home 812 through a tree-like communication network. The data is transmitted from the head-end 802 to one or more nodes 804 via a fiber optic link. From the nodes 804, the data propagates to customer set top boxes 810 via coaxial cable. The communication link from the node to the set top boxes may traverse one or more amplifiers 806 and taps 808. Lines from the taps 808 extend to individual customer premises. The nodes 804, the amplifiers 806 and the taps 808 are transparent to all but the lowest-level system operations. These elements merely relay and route data from the head-end unit 802 to the customer set top boxes 810.

Figure 9:
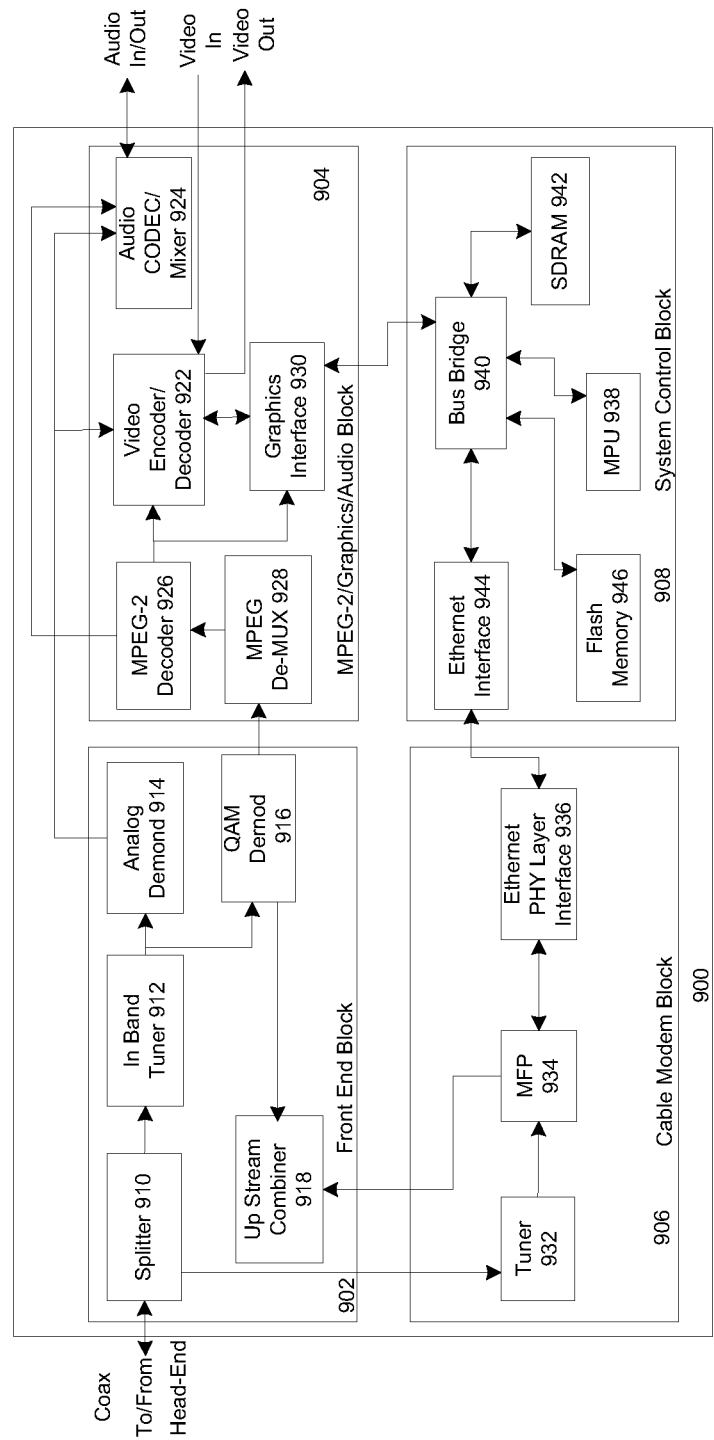
FIG. 9 is a block diagram in accordance with an embodiment of the present invention.

FIG. 9 is a block diagram of one possible embodiment of set top box 900, which can be used as the set top box 810 in FIG. 8. For simplicity, only certain components of the set-top box are shown. Additionally, some functions of the various components described herein may actually be performed by a single component or integrated chip.

A signal from the head end 802 is received at the splitter 910 located in the Front End Block 902. The signal may be received at the set top box 900 via a coaxial cable. The signal is passed to the In Band tuner 912 that tunes to a particular 6 MHz channel. The 6 MHz channel can either be an analog signal or a QAM modulated digital signal. The analog signal containing analog programming is sent directly to the MPEG-2/Graphics/Audio Block 904 via the Analog Demodulator (Analog Demod) 914. The baseband video portion of the analog signal is output via Video Encoder/Decoder 922. The baseband audio portion of the analog signal is output via the Audio CODEC/Mixer 924.

The QAM modulated digital portion of the signal containing digital programming is sent to the MPEG-2/Graphics/Audio Block 904 via the QAM Demodulator (QAM Demod) 916. The QAM Demod 916 outputs a MPEG transport stream to the MPEG De-Multiplexer (MPEG De-MUX) 928. The incoming MPEG transport stream is de-multiplexed into its component primary video stream, primary and secondary audio streams, and control signals by the MPEG De-MUX 928. The de-multiplexed digital data is passed onto the Graphics Interface 930. The baseband video portion of the digital signal is output via the Video Encoder/Decoder 922. The baseband audio portion of the digital signal is output via the Audio CODEC/Mixer 924.

The cable television service may provide a user interface (UI) with vertical navigation to customers. The UI is based on a client-server communication architecture that is established between the head end 802 and the set top boxes 900 within digital channels. A user initiated request for the UI from a remote control or front panel of the set top box 810 causes the Main Processor Unit (MPU) 938 located in the System Control Block 908 to post a request for the UI. An HTTP request is sent from the Ethernet Interface 944 of the System Control Block 908 to the Ethernet Interface 936 of the Cable Modem Block 906. The Multi-Function Processor (MFP) 934 processes the request and passes the processed request to the Up-Stream Combiner 918 in the Front End Block 902. The Cable Modem Block 906 uses a DOCSIS (Data Over Cable Service Interface Specifications) standard to process the HTTP request. The Front End Block 902 sends the HTTP request for the UI to the Head-End 802 to process the request.

A server in the Head-End 802 generates dynamic web pages in response to HTTP request. The web pages in the form of IP data packets are sent back to the set top box 810 via the coax cable. The web pages are received at the Tuner 932 in the Cable Modem Block 906 via the Splitter 910. The Tuner 932 is tuned to a specific downstream channel and receives the IP data packets. The MFP 934 identifies and selects only the IP data packets that are addressed to that particular cable modem. The selected IP data packets are sent to the System Control Block 908 via the Ethernet Interface 944. The MPU 938 stores the IP data packets representing the UI pages in the SDRAM 942.

The Flash Memory 946 in the System Control Block 908 stores operating code for the set top box 810 as well as a browser that is used to retrieve and display the UI. Upon boot-up of the set top box, relevant portions of the code are loaded in the SDRAM 942 to use as an operating copy. The browser processes the web pages and generates commands that are sent to the Graphics Interface 930 to render the web-page on the TV screen upon request from the user. The Graphics Interface 930 stores bitmapped representations of the requested pages in frame buffer memory, which are in a digital form. The Graphics Interface 930 and the Video Encoder/Decoder 922 cause the UI image to be painted on the screen, as described below.

Each request for the UI returns a new UI page with updated data. Each new request from the user causes the Head-End 802 to retrieve the requested web page data and forward the data to the set top box 810 that requests it. Depending on the request, web pages relevant to the user's request are sent to the set top box. For example, if a user requests an UI for "On Demand" then the data relating to the On Demand sub categories will be sent to the set top box 810.

The browser running on the set top box formats the web pages for display. Javascript routines within the web pages permit users to navigate through the UI. As the user navigates the UI, the MPU retrieves the appropriate data stored in the SDRAM 942 and renders it into the data to the MPEG-2/Graphics Block 904 for display.

Figure 10:
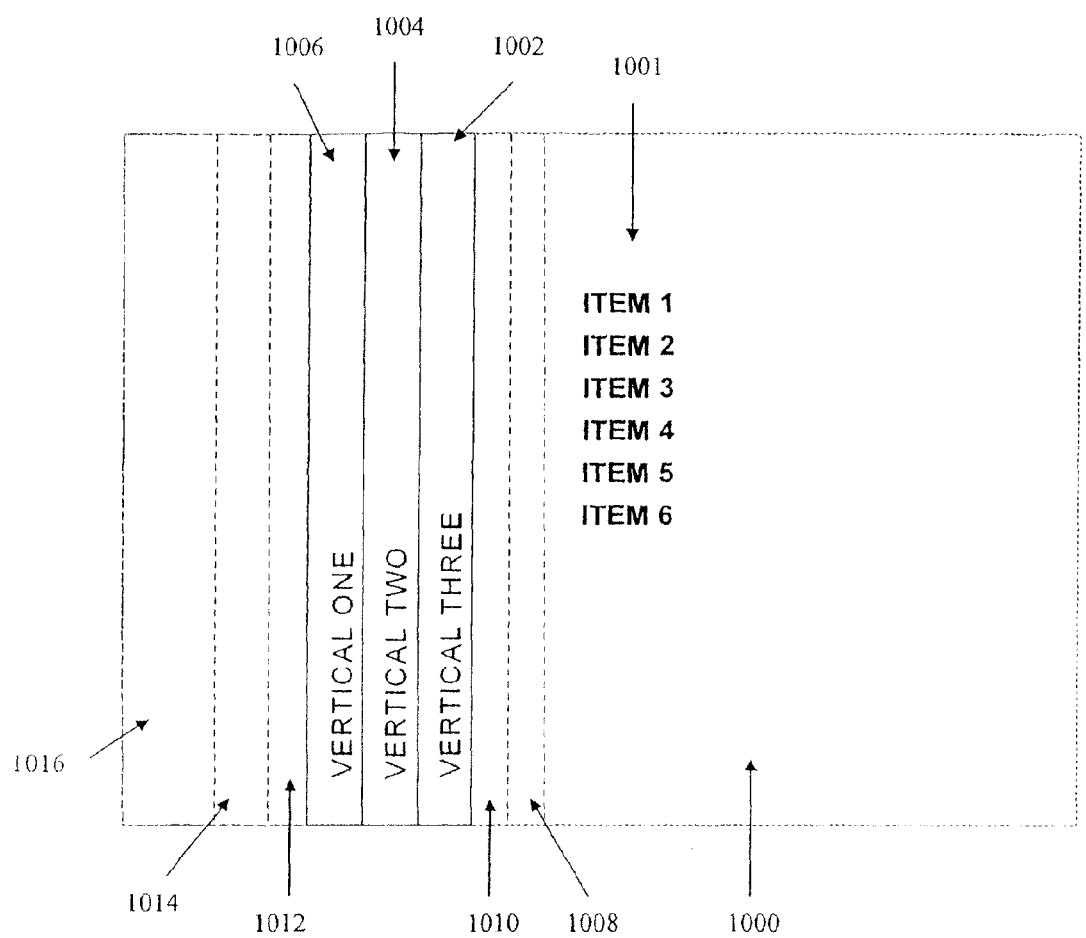
FIG. 10 is a diagram in accordance with an embodiment of the present invention.

FIG. 10 illustrates a screen layout 1000 that may be used in the images generated in accordance with embodiments of the present invention. The screen layout 1000 includes horizontal display area 1001 where an item or list of items may be horizontally displayed. Items may be vertically displayed in the first vertical display area 1002, the second vertical display area 1004, and the third vertical display area 1006. Any number of vertical display areas may be used in accordance with the present invention. A static primary screen name 1016 can be displayed.

FIG. 10 also illustrates non-visible portions 1008, 1010, 1012 and 1014. As described above, when an item is selected from the horizontally displayed items, the selected item or an indication of the selected item is displayed vertically in the vertical display area. In an embodiment, the vertically displayed items move from right to left as further items are selected from the horizontally displayed items. The number of vertical display areas may be limited to a specific number, such as three as shown in FIG. 10, and this may depend on the available screen space or other factors. Once all of the vertical display areas being used in any particular implementation are filled, as additional horizontally displayed items are selected, for each additional selection, one of the vertically displayed items will move to one of the non-visible portions. Any number of non-visible portions may be used. The items in non-visible portions are not visible, but are buffered for recall to a vertical display area as a user traverses the vertical display portions with the screen indicator.

For example, in an embodiment that uses three vertical display areas, any number of selections over three from the horizontally displayed items will result in one or more of the non-visible portions being filled. If a user had made seven selections, three items would be displayed in the vertical display positions, and four items would be buffered in the non-visible portions. The user can vertically navigate to any of the selected items by causing the screen indicator to traverse across the vertically displayed items. In an embodiment, if the screen indicator is on the third vertical display area and the user traverses to the left, for example by pressing a left arrow key, then a new image is generated in which the item buffered in non-visible portion 1002 is now moved to be vertically displayed in the third vertical display area 1006, with each of the items previously displayed in the vertical display area being re-displayed one position to the right. The vertically displayed item that had been previously displayed in vertical position 1002 is now moved into non-visible position 1010. In this way, a user can easily and quickly traverse to any of the previously selected items.

Figure 11:
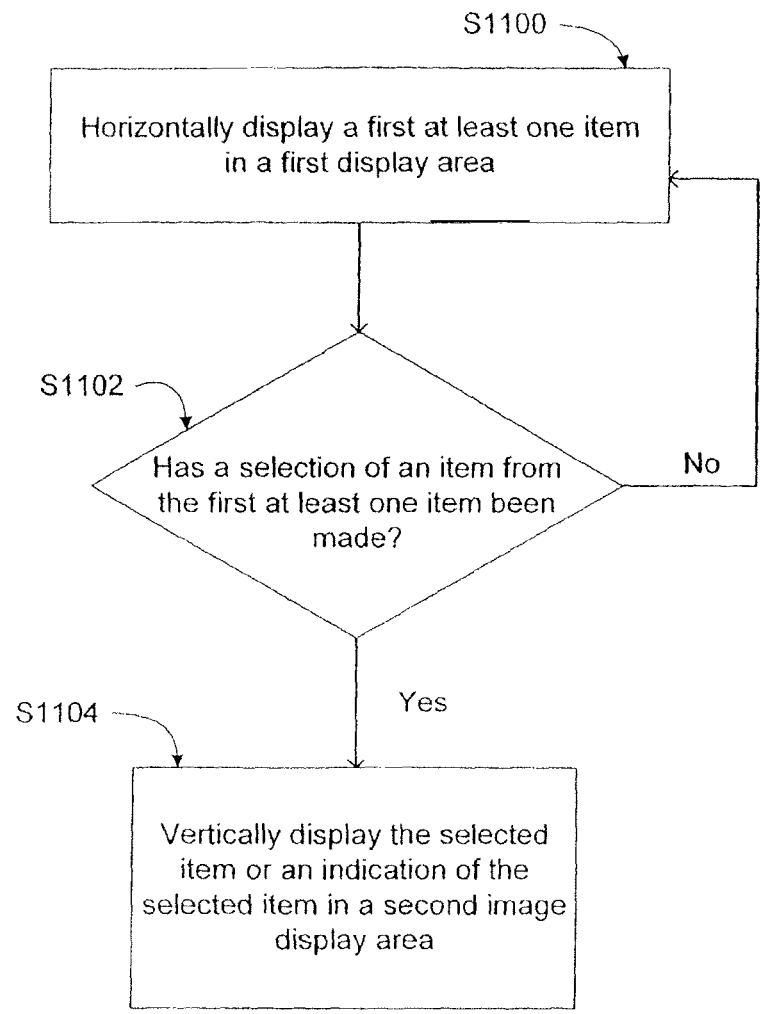
FIG. 11 is a flowchart in accordance with an embodiment of the present invention.

FIG. 11 illustrates a flowchart showing steps that may be carried out in embodiments of the invention. In step S1100, a first at least one item is horizontally displayed in a first display area. In S1102, it is determined whether an item from the at least one horizontally displayed item has been selected. If such an item has been selected, than in S1104 the selected item or an indication of the selected item is vertically displayed in a second image display area. If no selection has been made at S1102, the continued horizontal display of the at least one item occurs.

Figure 12:
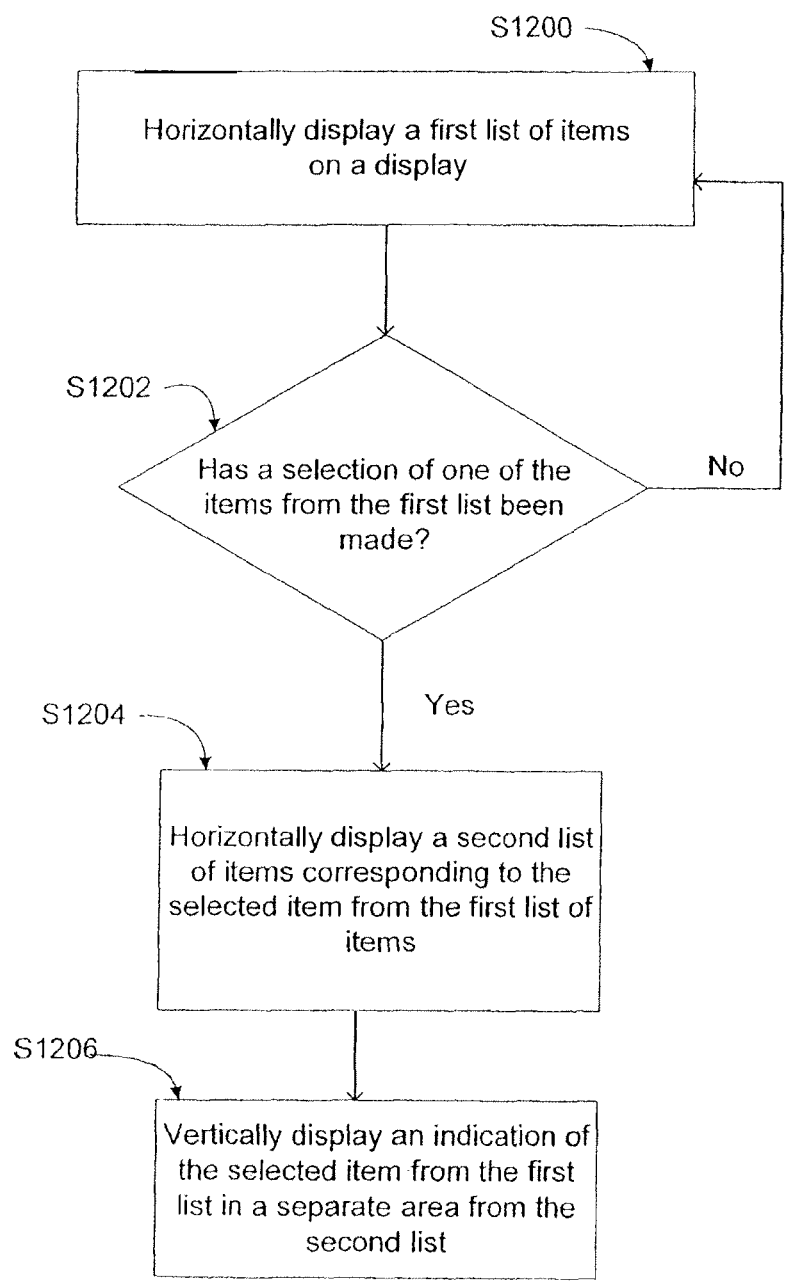
FIG. 12 is a flowchart in accordance with an embodiment of the present invention.

FIG. 12 illustrates a flowchart showing steps that may be carried out in embodiments of the invention. In step S1200, a first list of items is horizontally displayed. In S1202, it is determined whether there has been a selection from the first list of items. If there has not been a selection, display of the first list of items is continued. If there has been a selection from the first list of items, in S1204 a second list of items corresponding to the selected item is horizontally displayed, and an indication of the selected item is vertically displayed in a separate area from the second list of items.

Figure 13:
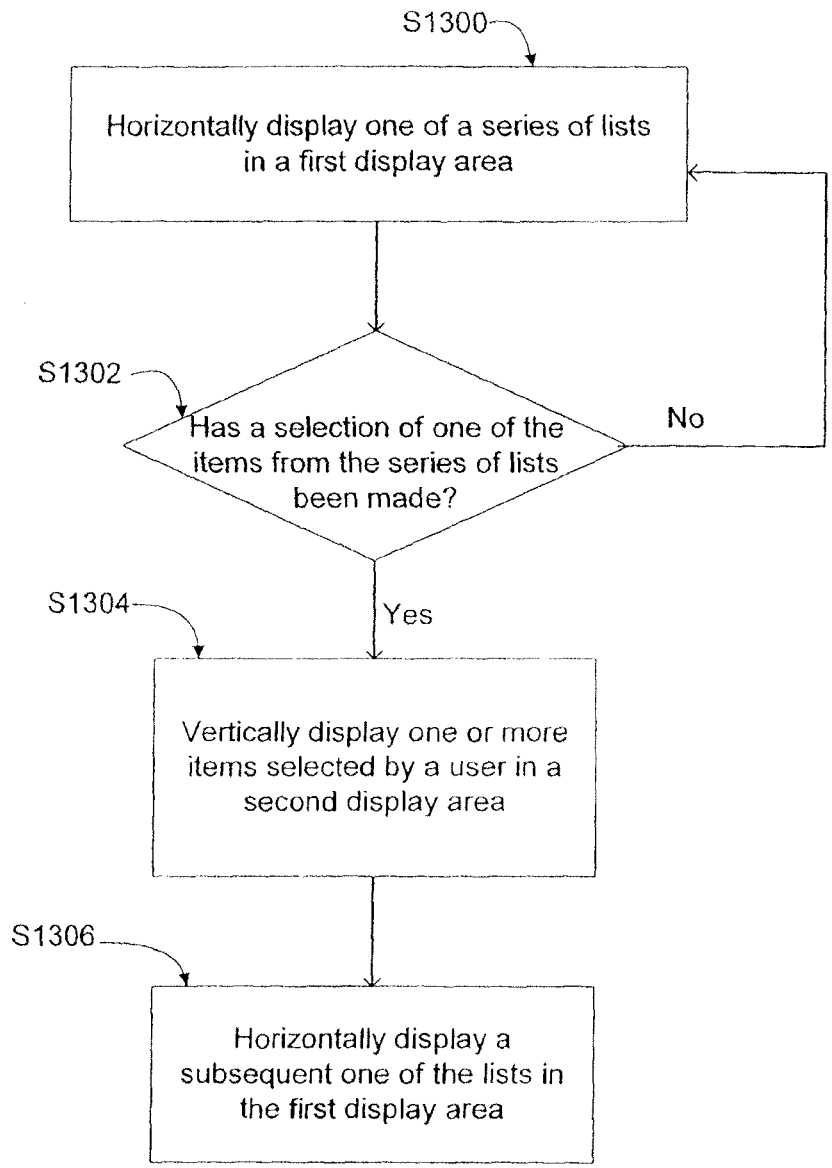
FIG. 13 is a flowchart in accordance with an embodiment of the present invention.

FIG. 13 illustrates a flowchart showing steps that may be carried out in embodiments of the invention. In step S1300, one of a series of lists is horizontally displayed in a first display area. In S1302, it is determined whether a selection of one of the items from the series of lists has been made. If a selection has not been made, horizontal display of one of the series of lists in the first display area continues. In S1304, if a selection has been made, one or more items selected by a user from the series of lists is vertically displayed in a second display area, and a subsequent one of the lists is horizontally displayed in the first display area.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for displaying images with a graphical user interface, comprising:
   displaying a first list of items horizontally on a display;
   upon selection by a user of one of the items in the first list, horizontally displaying a second list of items, the second list of items being associated with the selected item from the first list of items; and
   vertically displaying an indication of the selected item from the first list of items in a separate area from the second list of items.

2. The method of claim 1, wherein the indication of the selected item from the first list of items is displayed substantially perpendicular to items in the second list of items.

3. The method of claim 1, wherein the second list of items is hortizontally displayed in place of the first list of items.

4. The method of claim 1, further comprising, upon selection by the user of one of the items in the second list, displaying a third list of items in place of the second list of items, the third list of items corresponding to the selected item from the second list of items.

5. The method of claim 4, further comprising vertically displaying at the selected item from the second list of items adjacent the third list of items.

6. The method of claim 5, further comprising vertically displaying the indication of the selected item from the first list of items adjacent the selected item from the second list of items.

7. The method of claim 6, wherein the selected item from the second list of items is displayed between the third list of items and the item selected from the second list of items.

8. The method of claim 4, further comprising, upon selection of an item from the third list of items, displaying a fourth list of items in place of the third list of items, the fourth list of items corresponding to the item selected from third list of items.

9. The method of claim 8, further comprising vertically displaying the selected item from the third list of items adjacent the fourth list of items.

10. The method of claim 9, further comprising vertically displaying the selected item from the second list of items adjacent the selected item from the third list of items.

11. The method of claim 10, wherein the selected item from the third list of items is displayed between the fourth list of items and the selected item from the second list of items.

12. The method of claim 10, further comprising vertically displaying the indication of the selected item from the first list of items adjacent the selected item from the second list of items.

13. The method of claim 12, wherein the indication of the selected item from the second list of items is displayed between the selected item from the third list of items and the selected item from the first list of items.

14. The method of claim 13, further comprising, upon user selection of one of the vertically displayed, selected items from the first list or the second list, redisplaying a corresponding one of the first list or the second list.

15. The method of claim 8, further comprising, upon selection of an item from the fourth list of items, displaying a fifth list of items in place of the fourth list of items, the fifth list of items corresponding to the item selected from the fourth list of items.

16. The method of claim 15, further comprising allowing the user to select any of the indication of selected items from the first list of items, the selected item from the second list of items, the selected item from the third list of items, or the selected item from the fourth list of items.

17. The method of claim 15, further comprising:
vertically displaying the selected item from the fourth list of items adjacent the fifth list of items and in place of the selected item from the third list of items;
vertically displaying the selected item from the third list of items adjacent the selected item from the fourth list of items;
vertically displaying the selected item from the second list of items adjacent the selected item from the third list of items; and
placing the indication of the selected item from the first list of items in a non-visible portion adjacent the selected item from the second list of items.

18. The method of claim 17, wherein the user can traverse a screen indicator to any of the vertically displayed selected items from the second, third and fourth lists of items and the indication of the selected item from the first list of items.

19. An electronic device having a graphical user interface, comprising:
a screen for displaying the graphical user interface;
means for allowing a user to make selections on the graphical user interface;
image generation means for causing display of a first list of items horizontally on the screen, upon selection by the user of one of the items in the first list, causing horizontal display of a second list of items, the second list of items being associated with the selected item from the first list of items, and causing an indication of the selected item from the first list of items to be vertically displayed in a separate area from the second list of items.

20. A display system, comprising:
an image generation device that generates images on a display, the images on the display including a first image display area and a second image display area, the first image display area displaying a first at least one item horizontally on the display, and the second image display area vertically displaying an indication of at least one item selected by a user from the first image display area.

* * * * *